(12) United States Patent  (10) Patent No.: US 6,379,029 B1
Stanton                     (45) Date of Patent:  Apr. 30, 2002

(54) NON-INVASIVE AFTERMARKET VEHICLE OPERA LIGHT FIXTURE

(76) Inventor: Martin P. Stanton, 1010 SE. Letha Cir. #7, Stuart, FL (US) 34994

( * ) Notice: Subject to any disclaimer, the term of this patent is extended or adjusted under 35 U.S.C. 154(b) by 0 days.

(21) Appl. No.: 09/585,374

(22) Filed: Jun. 1, 2000

Related U.S. Application Data

(60) Provisional application No. 60/136,931, filed on Jun. 1, 1999.

(51) Int. Cl.$^7$ .................................. B60J 1/10
(52) U.S. Cl. ................ 362/501; 362/84; 362/396; 362/540; 362/544; 362/503; 362/506; 362/549; 362/493
(58) Field of Search ................ 362/84, 501, 493, 362/503, 506, 549, 544, 540, 396

(56) References Cited

U.S. PATENT DOCUMENTS

| 3,017,500 A |   | 1/1962  | Pezzopane |
|---|---|---|---|
| 3,532,871 A |   | 10/1970 | Shipman |
| 4,138,620 A | * | 2/1979  | Dickson ..................... 362/225 |
| 4,494,326 A | * | 1/1985  | Kanamori .................... 362/84 |
| 4,855,878 A |   | 8/1989  | Vu et al. |
| 4,953,065 A |   | 8/1990  | Kao |
| 5,025,352 A |   | 6/1991  | Brown |
| 5,038,253 A |   | 8/1991  | Nishihashi et al. |
| 5,072,340 A |   | 12/1991 | Jones |
| 5,255,164 A |   | 10/1993 | Eidelman |
| 5,528,468 A | * | 6/1996  | Stanton ....................... 362/80 |
| 5,560,701 A | * | 10/1996 | Payne ......................... 362/80 |
| 5,974,711 A | * | 11/1999 | Tipke .......................... 40/591 |
| 6,037,865 A | * | 3/2000  | Heinz et al. .................. 362/84 |
| 6,092,916 A | * | 7/2000  | Davis, Jr. et al. ........... 362/490 |
| 6,116,678 A | * | 9/2000  | Beck ..................... 296/146.15 |

* cited by examiner

Primary Examiner—Sandra O'Shea
Assistant Examiner—Anabel M. Ton
(74) Attorney, Agent, or Firm—Oltman, Flynn & Kubler

(57) ABSTRACT

A vehicle lighting fixture for securing to a vehicle, the lighting fixture includes a base panel having a base panel front surface and a base panel rear surface and having a non-invasive attachment mechanism on the base panel rear surface, and having a strap engaging mechanism; a laterally extending wire cover strap securable to the strap engaging mechanism and having a cover strap rear surface and having non-invasive attachment mechanism on the cover strap rear surface; a light source secured against the base panel front surface; a lens panel extending over the front of the light source and secured to the base panel front surface; and a lens frame secured over the lens panel and covering the perimeter of the lens panel, and connected to the lens panel by a lens frame connector mechanism.

14 Claims, 4 Drawing Sheets

NON-INVASIVE AFTERMARKET VEHICLE OPERA LIGHT FIXTURE

FILING HISTORY

This application continues from provisional application Ser. No. 60/136,931 filed on Jun. 1, 1999.

BACKGROUND OF THE INVENTION

1. Field of the Invention

The present invention relates generally to the field of automobile accessories and automobile lighting fixtures. More specifically the present invention relates to an aftermarket lighting fixture mountable on virtually any metal or glass surface of an automobile or other vehicle without boring fastener holes into the vehicle. The lighting fixture preferably is configured as an opera light and is preferably mounted on the upright rear window frame segment of an automobile front door so that the lighting fixture overlaps but is not connected to the upright forward window frame segment of the adjacent rear door. This overlapping mounting creates the illusion that the fixture is a stock opera light of the type found on many luxury cars, in which the fixture is mounted during vehicle manufacture to a door post and fits within adjacent cut-out regions in the front and rear door window frames.

The fixture includes a base panel having non-invasive attachment means on its rear surface and strap engaging means, and a laterally extending wire cover strap securable to the strap engaging means and having non-invasive attachment means on its rear surface. The wire cover strap covers wires extending from the fixture into the vehicle, the wires ultimately connecting to a vehicle wiring harness. A light source is secured to or sandwiched against the base panel front surface, and a transparent or translucent lens panel extends over the front of the light source and is secured such as with a suitable weather resistant adhesive to the base panel. A lens frame is secured with the weather resistant adhesive over the lens panel and covers the perimeter of the lens panel, and is connected to the lens panel with the adhesive. The base panel and lens panel are both preferably shaped as elongate rectangles and are mounted with double sided tape to and substantially vertically and parallel with the upright front door window frame segment.

2. Description of the Prior Art

There have long been various lighting fixtures for illuminating an automobile for style and safety. For example, opera lights which mount on the door post are known.

One such lighting fixture is that of the present applicant as described in U.S. Pat. No. 5,528,468, issued on Jun. 18, 1996 to Stanton, which discloses an opera light kit and installation method for an automobile. The opera light was screwed to holes bored into an automobile door post and the light was mounted in a door flange cut out through the vehicle side door frames. Electrical current was delivered to the light source through a special screw passing from the opera light into the vehicle. A disadvantage of this prior version of the present opera light is that the vehicle mounting surface was permanently altered by the drilling of mounting holes for screws.

Pezzopane, U.S. Pat. No. 3,017,500, issued on Jan. 16, 1962, reveals a lamp assembly mounted in automobile fenders above the wheels. A hole is made in the fender which receives, a cylindrical bulb retaining chamber having a removably outer lens. The light is intended to facilitate changing tires at night, and for gauging distance to adjacent vehicles during driving and parking. A problem with Pezzopane is that the lights are aesthetically unappealing, resembling airplane running lights or illuminated ship port holes.

Shipman, U.S. Pat. No. 3,532,871, issued on Oct. 6, 1970, discloses a combination running light-reflector for mounting on a motor vehicle, such as on a fender. Shipman includes a lens shaped to allegedly provide efficient light reflection through which both reflective ambient light and light emitted from a bulb are projected. A problem with Shipman is that no provision is made for securing the light adjacent to a door post to function as an opera light.

Vu, et al., U.S. Pat. No. 4,855,878, issued on Aug. 8, 1989, reveals a back-up side fender light. The light includes a bulb wired within a housing removably mounted within an automobile front fender. The lamp is wired to activate when the vehicle gear shift lever is placed in the reverse position. A problem with Vu, et al., if used as an opera light, is that no method, structure or circuitry for mounting adjacent to a door post is provided.

Kao, U.S. Pat. No. 4,953,065, issued on Aug. 28, 1990, discloses a brake light device for mounting on a truck fender. The purpose of this Kao device is to position a brake light lower than the truck trailer so that it is at the level of an automobile driver and more easily seen. Kao may be suited for its purpose, but provides no needed structure, circuitry or attachment procedure for use as an opera light. If the Kao circuitry were used, the opera light would only come on when the brakes are applied. Another problem with Kao is that it is needlessly complex and expensive.

Brown, U.S. Pat. No. 5,025,352, issued on Jun. 18, 1991, reveals lighted grab handles for trucks. A vertically extending gripping portion has means for attachment to a motor vehicle, and a lamp means at one or both ends. The lamps are electrically connected to the vehicle running lamp circuitry. A problem with Brown is that it would make a luxury car look like a utility vehicle if such a handle were projecting from or adjacent to a door post, and the handle may block closing of the doors as well.

Nishihashi, et al., U.S. Pat. No. 5,038,253, issued on Aug. 6, 1991, discloses a vehicle lamp having a series of individual light sources within an elongate casing. Nishihashi is too bulky, complex and expensive for use as an opera light, and does not teach installation on or adjacent to a door post nor for avoidance of door flanges interference.

Jones, U.S. Pat. No. 5,072,340, issued on Dec. 10, 1991, teaches a signal lamp visible to a vehicle driver. This lamp apparatus is mounted either on top of the hood above the headlights or on the rear side portions of the rear fenders. Jones, like Nishihashi, fails to disclose means for installation on or adjacent to a door post nor for avoidance of door flange interference.

Eidelman, U.S. Pat. No. 5,255,164, issued on Oct. 19, 1993, reveals safety light markers for the sides and roof of a motor vehicle. Eidelman includes elongated light sources connected to the vehicle signalling and electrical circuit, to provide braking, parking, emergency flasher and turn indications conspicuously visible from the sides of the vehicle. The teachings of Eidelman present the problems of Nishihashi if applied to an opera light assembly.

It is thus an object of the present invention to provide an aftermarket lighting fixture having non-invasive attachment means for securing the fixture to an outside surface of an automobile or other vehicle without creating fastener holes in the vehicle, the outside surface being virtually any metal or glass surface.

It is another object of the present invention to provide such a lighting fixture for which the non-invasive attachment means can mount the fixture permanently to the vehicle and yet permit removal of the fixture without damage to the vehicle surface to which it is mounted, and preferably takes the form of double sided tape.

It is yet another object of the present invention to provide such a lighting fixture which is suitable for creating the visual impression of a factory installed opera light centered over both the front and rear door window frames which permits opening of the front and rear doors without dislodging the fixture.

It is a still further object of the present invention to provide such a lighting fixture which increases vehicle visibility from the side so that the driver of a vehicle in an adjacent lane can better see the fixture equipped vehicle when it is in a blind spot, and which optionally flashes with turn signal lights on that side of the equipped vehicle to alert drivers in adjacent lanes that a lane change is intended.

It is still another object of the present invention to provide such a lighting fixture which includes a wire cover strap projecting laterally from the fixture to protect light source power wires extending from the fixture into the vehicle to a vehicle wiring harness, where the wire cover strap prevents the fixture from being entirely dislodged from the vehicle by attachment means failure, by attempted theft, or otherwise, and protects the wires from sun and abrasion damage and aesthetically covers the wires.

It is finally an object of the present invention to provide such a lighting fixture which is easily installed, is simple in design and which is inexpensive to manufacture.

SUMMARY OF THE INVENTION

The present invention accomplishes the above-stated objectives, as well as others, as may be determined by a fair reading and interpretation of the entire specification.

A vehicle lighting fixture is provided for securing to a vehicle, the lighting fixture including a base panel having a base panel front surface and a base panel rear surface and having a non-invasive attachment mechanism on the base panel rear surface, and having a strap engaging mechanism; a laterally extending wire cover strap securable to the strap engaging mechanism and having a cover strap rear surface and having non-invasive attachment mechanism on the cover strap rear surface; a light source secured against the base panel front surface; a lens panel extending over the front of the light source and secured to the base panel front surface; and a lens frame secured over the lens panel and covering the perimeter of the lens panel, and connected to the lens panel by a lens frame connector mechanism.

Where the vehicle has a front side door having a front door window frame with a front door window frame rear upright segment and the vehicle has an adjacent rear side door with a rear door window frame with a rear door window frame front upright segment adjacent to the front door window frame rear upright segment; the lighting fixture preferably is mounted on the front door window frame rear upright segment so that the lighting fixture overlaps but is not connected to the rear door window frame. The base panel and the lens panel preferably are both rectangular and have longitudinal axes and are mounted so that the longitudinal axes are substantially vertical and substantially parallel with the upright front door window frame segment to which the base panel is mounted. The lens frame preferably has an outer edge and an inner edge and the outer edge of the lens frame preferably substantially matches the shape and size of the base panel and the inner edge of the lens frame preferably is shaped to reveal a selected portion of the lens panel. The non-invasive attachment mechanism for the base panel and for the wire cover strap both preferably include double sided tape having a weather resistant adhesive. The double sided tape preferably includes an adhesive shielding cover strip for pealing off the double sided tape for exposure of tape adhesive for attachment of the fixture to a vehicle surface. The non-invasive attachment mechanism preferably includes two mating patches of hook and loop fastener material each patch having a patch rear surface, the patch rear surface of one patch being affixed to the base panel rear surface with a patch affixing mechanism and the patch rear surface of the other patch being affixed to the door window frame with the patch affixing mechanism. The strap engaging mechanism preferably includes a strap slot in the base plate; and a T-shaped end of the wire cover strap sized to fit engagingly into the strap slot by rotating the T-shaped end to pass through the strap slot, and to engage the strap slot by then rotating the T-shaped end perpendicular to the slot so that the top of the T-shape are behind the edges of the strap slot and abut the rear surface of the base plate. The light source preferably includes an electroluminescent strip. The light source preferably includes at least one incandescent lamp and socket. The lens frame preferably is at least partially covered with reflective material to enhance vehicle visibility from the side of a vehicle to a driver in an adjacent lane.

A vehicle is provided including an electrical system and vehicle lights powered by the electrical system and connected to the electrical system by a vehicle wiring harness, the vehicle having a front side door having a front door window frame with a front door window frame rear upright segment and the vehicle has an adjacent rear side door with a rear door window frame with a rear door window frame front upright segment adjacent to the front door window frame rear upright segment; and a lighting fixture including a base panel having a base panel front surface and a base panel rear surface and having a non-invasive attachment mechanism on the base panel rear surface; a light source secured against the base panel front surface; and a lens panel extending over the front of the light source and secured to the base panel front surface, the lighting fixture being mounted on the front door window frame rear upright segment so that the lighting fixture overlaps but is not connected to the rear door window frame.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
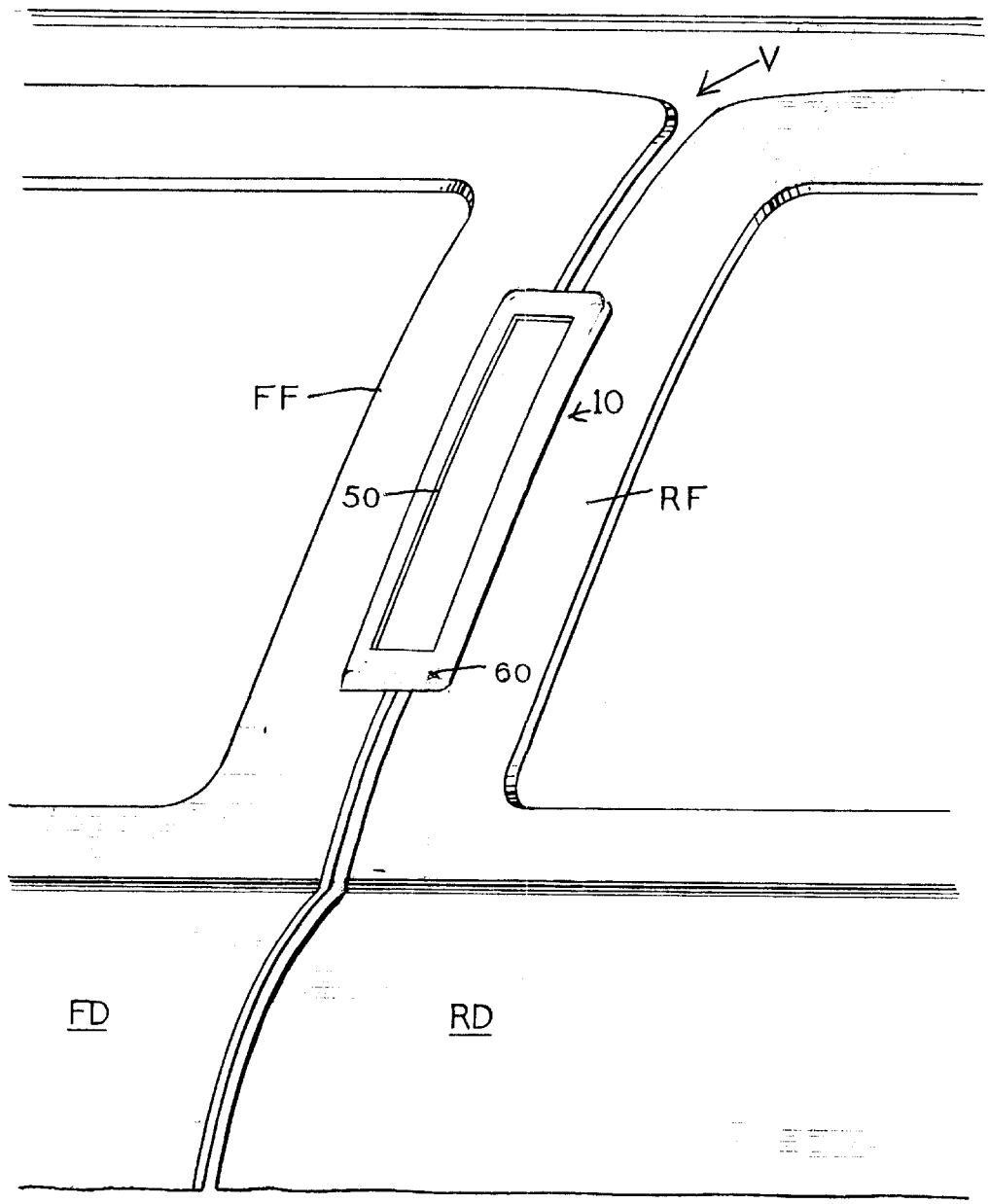
FIG. 1 is a broken away perspective side view of the mid-section of an automobile showing the inventive lighting fixture mounted in the preferred location to the front side door rear upright window frame segment and overlapping but not connected to the rear side door front upright window frame segment.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
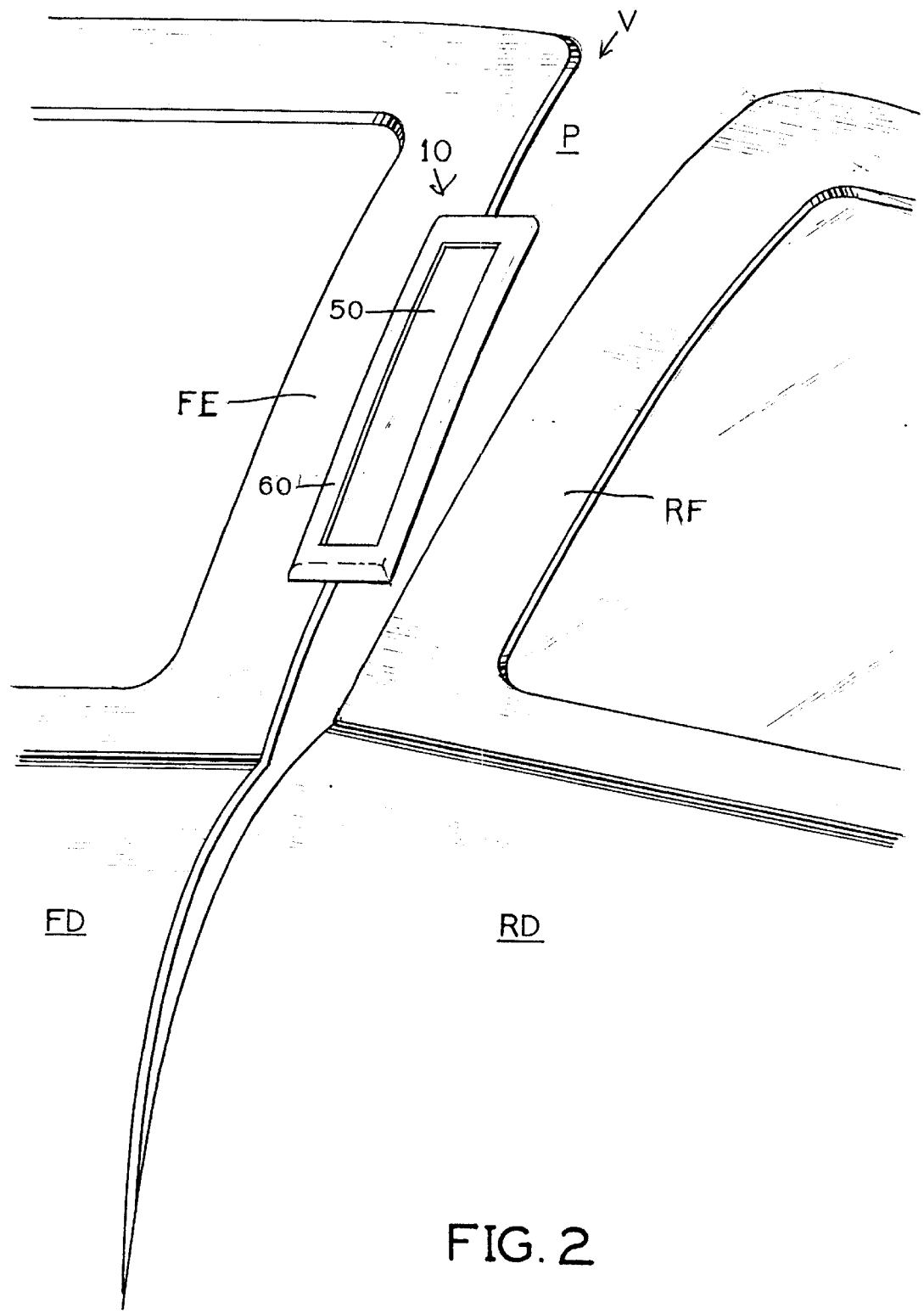
FIG. 2 is a view as in FIG. 1 with the rear door open, showing how the lighting fixture permits opening of front and rear vehicle doors without fixture disengagement.
Figure 3:
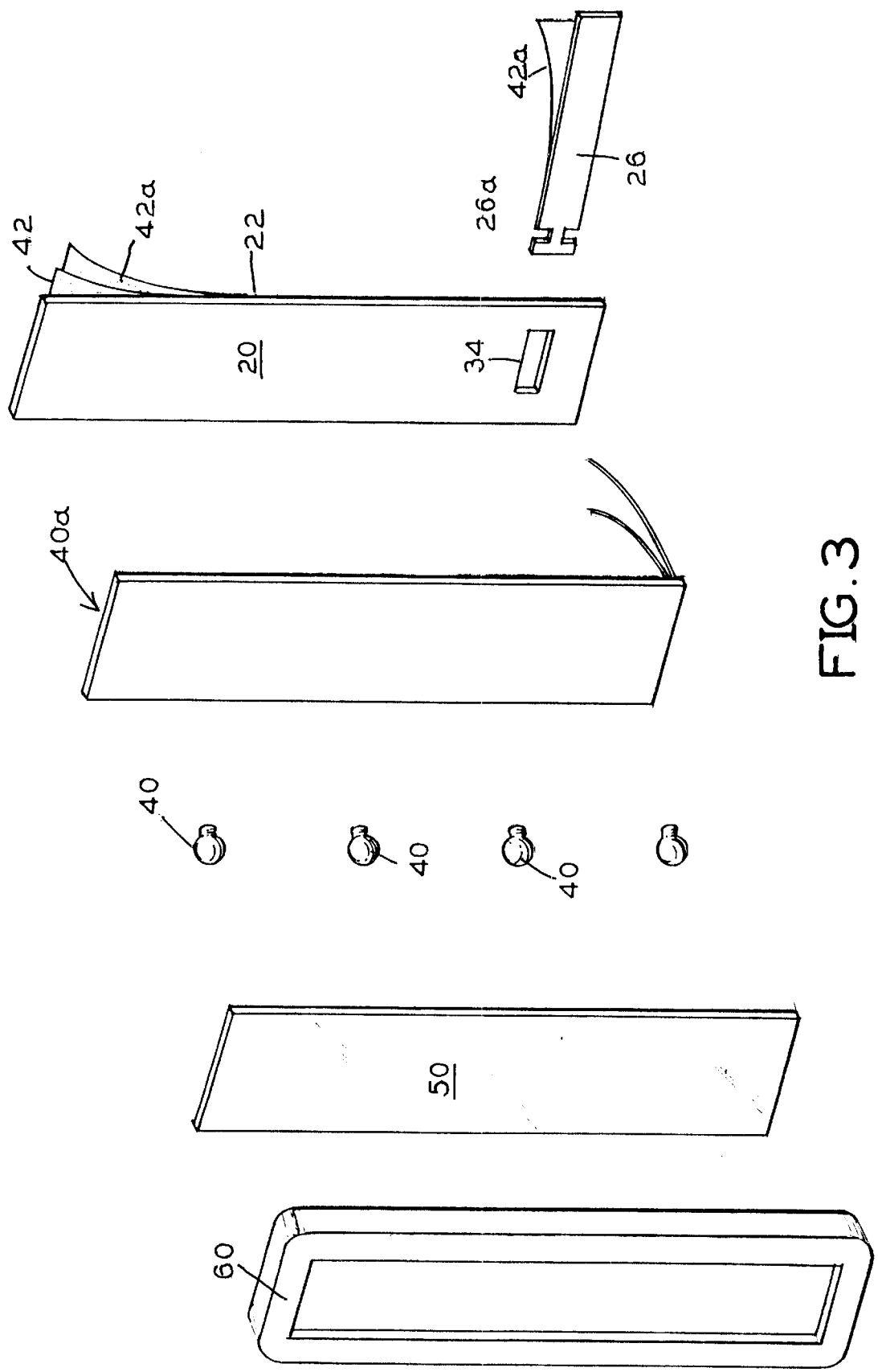
FIG. 3 is an exploded view of the preferred lighting fixture, showing alternative light source layers in the form of an electroluminescent strip and four light bulbs.
Figure 4:
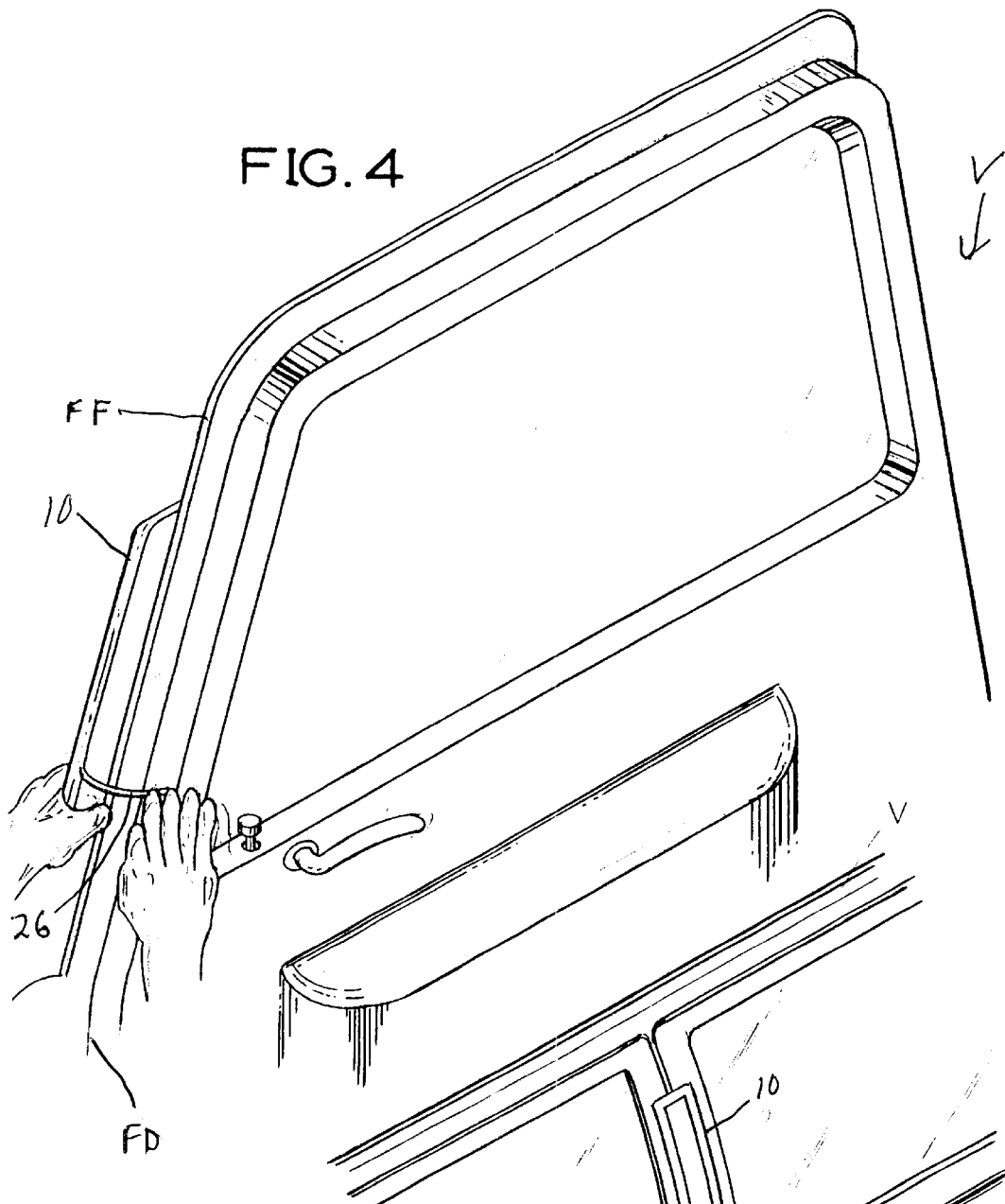
FIG. 4 is a perspective view of the apparatus being installed on an automobile front door, and specifically showing the wire cover strap being pressed into place around the door window frame to the point where the fixture wires enter the door or otherwise extend to a vehicle wiring harness.
Figure 5:
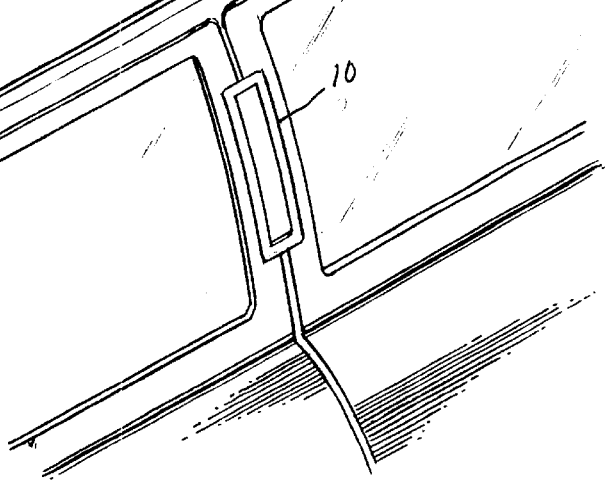
FIG. 5 is a perspective view of the mid-section of an automobile as in FIG. 1, showing the preferred embodiment of the lighting fixture installed at the preferred location.

Referring to FIGS. 1–5, an aftermarket lighting fixture 10 is disclosed which is preferably configured as an opera light and is preferably mounted on the upright rear window frame segment FF of an automobile front door FD so that the lighting fixture 10 overlaps but is not connected to the upright forward window frame segment RF of the adjacent rear door RD. This overlapping mounting creates the illusion that the fixture 10 is a stock opera light of the type found on many luxury cars, in which the fixture is mounted during automobile manufacture to the door post P within adjacent cut-out regions in the door window frames.

Fixture 10 includes a base panel 20 having non-invasive attachment means 22 on its rear surface and strap engaging means 24, and a laterally extending wire cover strap 26 securable to the strap engaging means 24 and having non-invasive attachment means 28 on its rear surface. A light source 40 is secured with a suitable weather resistant adhesive to, or simple, placed against the base panel 20 front surface, and a transparent or translucent lens panel 50 extends over the front of the light source 40 and is secured to the base panel 20 with the weather resistant adhesive. A lens frame 60 extends over the lens panel 50 and covers the perimeter of the lens panel 50, and is connected to the lens panel 50 with the adhesive. Lens frame 60 is preferably formed of plastic with chrome on its front face. The base panel 20 and lens panel 50 are both preferably shaped as elongate rectangles mounted substantially vertically and parallel with the upright front door window frame segment FF to which it is mounted. The base panel 20 and lens panel 50 are alternatively both matching disks, or have any other desired geometric shape. The outer edge of the lens frame 60 matches the shape and size of the base panel 20 and the inner edge of the lens frame 60 is shaped as desired to reveal a substantial portion of the lens panel 50. The non-invasive attachment means 22 for the base panel 20 and the wire cover strap 26 is preferably a double sided tape 42 covered with a durable, outdoor adhesive, and having a cover sheet 42a which is pealed off for fixture 10 attachment to the front door window frame segment FF. An alternative is mating patches of hook and loop fastener material, the rear surface of one patch being affixed to the rear surface of the base panel 20 with adhesive and the rear surface of the other patch being affixed to the front door window frame segment FF with the adhesive. The strap engaging means 24 preferably include a strap slot 34 in the base plate 20 and a corresponding T-shaped end 26a of the wire cover strap 26 which fits engagingly into the strap slot 34 by rotating the T-shaped end 26a so that the ends of the T-cross-bar pass through the slot 34, and then rotating the T-shaped end 26a of the strap 26 so that the ends of the T-cross bar are beyond the edges of the strap slot 34 and abut the rear surface of base plate 20. See FIG. 3. The light source 40 is preferably an electroluminescent strip, or EL strip, or at least one incandescent lamp and socket. The light source wires 44 extend laterally from the base plate 20 around the front door window frame to a point between the door window frame FF and the door post P or inside the vehicle V where the wires 44 are routed to an existing vehicle light circuit, which may be a parking light circuit and optionally also a turn signal light circuit. The turn signal circuit would cause the fixture 10 on the given side of the vehicle to flash so that drivers of vehicles beside the equipped vehicle V know of an intent to change lanes, for example. The lens frame 60 is optionally covered with reflective paint or reflective tape to enhance vehicle V visibility from the side to a driver in an adjacent lane.

Method

In practicing the invention, the following method may be used. The opera light fixture 10 preferably is provided to the end consumer in assembled form, ready for installation on a vehicle V. To install the fixture 10 as an opera light centered between the front and rear door window frames FF and RF, the vehicle doors FD and RD are closed. The base plate 20 is then placed against the front and rear door window frames FF and RF so that the fixture 10 is centered relative to the window frames. Then a marker such as a grease pencil is moved around the outer edge of the fixture 10 to mark the fixture location on the upright front door window frame segment FF. Then the vehicle front door FD is opened and the cover sheet 42a is removed from the double sided tape 42 on the base plate 20 rear surface. Then the fixture 10 is placed firmly against the upright front door window frame segment FF and held in this position for several minutes to insure formation of a tight adhesive bond. Then the reinforcement strap 26 is progressively pressed along the inside of the front door FD, from its end engaged by the base plate 20, until the strap 26 intersects a vehicle door gasket G where the fixture wires 44 are desired to enter the vehicle V and the location of the strap 26 is marked once again by tracing its border with the grease pencil. Any unneeded length of strap 26 is cut away. Then the cover sheet 42a is pealed off the back of the strap 26 to expose the tape 42 adhesive. The fixture lead wires 44 are extended along the center line of the strap 26 and affixed to the strap 26 with the exposed tape 42 adhesive, and the strap 26 is then pressed along the prior selected path against the door FD along the path leading inside the vehicle V.

It is noted that there are equivalent ways of constructing fixture 10, such as by extruding the base panel 20 and lens frame 60 as a single combined structure having a flat tubular configuration, and separately extruding the lens panel 50 for insertion into extruded combined structure. The lens panel 50 may be connected to the light source 40 prior to such insertion. Such alternative construction does not change the essential, inventive elements, relationships and functions of the present invention.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A vehicle lighting fixture for securing to a vehicle, comprising:

a base panel having a base panel front surface and a base panel rear surface and having non-invasive attachment means on said base panel rear surface, and having strap engaging means;

a laterally extending wire cover strap securable to said strap engaging means and having a cover strap rear surface and having non-invasive attachment means on said cover strap rear surface;

a light source secured against said base panel front surface, and a lens panel extending over said front of said light source and secured to said base panel front surface;

and a lens frame extending over said lens panel and covering the perimeter of said lens panel, and connected to said lens panel by lens frame connector means.

2. The lighting fixture of claim 1, wherein the vehicle has a front side door having a front door window frame with a front door window frame rear upright segment and the vehicle has an adjacent rear side door with a rear door window frame with a rear door window frame front upright segment adjacent to the front door window frame rear upright segment;

wherein said fixture is mounted on the front door window frame rear upright segment such that the lighting fixture overlaps but is not connected to the rear door window frame.

3. The fixture of claim 1, wherein said base panel and said lens panel are both rectangular and have longitudinal axes and are mounted such that said longitudinal axes are substantially vertical and substantially parallel with the upright front door window frame segment to which said base panel is mounted.

4. The fixture of claim 1, wherein said lens frame has an outer edge and an inner edge and wherein the outer edge of said lens frame substantially matches the shape and size of said base panel and wherein the inner edge of said lens frame is shaped to reveal a selected portion of said lens panel.

5. The fixture of claim 1, wherein said non-invasive attachment means for said base panel and for said wire cover strap both comprises double sided tape having a weather resistant adhesive.

6. The fixture of claim 5, wherein said double sided tape comprises an adhesive shielding cover strip for pealing off said double sided tape for exposure of tape adhesive for attachment of said fixture to a vehicle surface.

7. The fixture of claim 2, wherein said non-invasive attachment means comprises two mating patches of hook and loop fastener material each said patch having a patch rear surface, the patch rear surface of one said patch being affixed to said base panel rear surface with patch affixing means and the patch rear surface of the other said patch being affixed to the door window frame with patch affixing means.

8. The fixture of claim 1, wherein said strap engaging means comprises:

a strap slot in said base plate;

and a T-shaped end of said wire cover strap sized to fit engagingly into said strap slot by rotating said T-shaped end to pass through said strap slot, and to engage said strap slot by then rotating said T-shaped end perpendicular to said slot such that the top of the T-shape are behind the edges of the strap slot and abut the rear surface of the base plate.

9. The fixture of claim 1, wherein said light source comprises an electroluminescent strip.

10. The fixture of claim 1, wherein said light source comprises at least one incandescent lamp and socket.

11. The fixture of claim 1, wherein said lens frame is at least partially covered with reflective material to enhance vehicle visibility from the side of a vehicle to a driver in an adjacent lane.

12. A vehicle lighting fixture for securing to a vehicle, comprising:

a base panel having a base panel front surface and a base panel rear surface and having non-invasive attachment means on said base panel rear surface;

a light source secured against said base panel front surface, and a lens panel extending over said front of said light source and secured to said base panel front surface;

wherein said base panel comprises strap engaging means;

wherein said lighting fixture additionally comprises wire cover strap securable to said strap engaging means;

and wherein said wire cover strap comprises a cover strap rear surface and has non-invasive attachment means on said cover strap rear surface.

13. A vehicle lighting fixture for securing to a vehicle, comprising:

a base panel having a base panel front surface and a base panel rear surface and having non-invasive attachment means on said base panel rear surface;

a light source secured against said base panel front surface, a lens panel extending over said front of said light source and secured to said base panel front surface;

and a lens frame secured over said lens panel and covering the perimeter of said lens panel, and connected to said lens panel by lens frame connector means.

14. A vehicle comprising:

an electrical system and vehicle lights powered by said electrical system and connected to said electrical system by a vehicle wiring harness, said vehicle having a front side door having a front door window frame with a front door window frame rear upright segment and said vehicle has an adjacent rear side door with a rear door window frame with a rear door window frame front upright segment adjacent to said front door window frame rear upright segment;

and a lighting fixture comprising a base panel having a base panel front surface and a base panel rear surface and having non-invasive attachment means on said base panel rear surface; a light source secured against said base panel front surface; and a lens panel extending over said front of said light source and secured to said base panel front surface, said lighting fixture being mounted on said front door window frame rear upright segment such that said lighting fixture overlaps but is not connected to said rear door window frame.

* * * * *